US012698768B2

(12) United States Patent
Belshan et al.

(10) Patent No.: US 12,698,768 B2
(45) Date of Patent: Aug. 4, 2026

(54) VALVE ASSEMBLY FOR A FLUID PUMP

(71) Applicant: SPM Oil & Gas Inc., Forth Worth, TX (US)

(72) Inventors: Daryl James Belshan, Weatherford, TX (US); David T. Figgs, Fort Worth, TX (US); Justin Poehls, Glen Rose, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/960,959

(22) Filed: Nov. 26, 2024

(65) Prior Publication Data

US 2026/0146603 A1 May 28, 2026

(51) Int. Cl.
*F04B 53/10* (2006.01)
*E21B 43/26* (2006.01)
*F16K 15/06* (2006.01)

(52) U.S. Cl.
CPC ........ *F04B 53/109* (2013.01); *E21B 43/2607* (2020.05); *F16K 15/066* (2013.01)

(58) Field of Classification Search
CPC .... E21B 43/26; F04B 53/109; F04B 53/1092; F16K 15/026; F16K 15/063; F16K 15/066; F16K 15/067
USPC .... 137/512.7, 512.5, 512.4, 512, 560, 512.3
See application file for complete search history.

(56) References Cited

U.S. PATENT DOCUMENTS

| | | | | |
|---|---|---|---|---|
| 2,128,039 | A * | 8/1938 | Cibulka | F16K 17/16 137/69 |
| 3,104,090 | A * | 9/1963 | Callahan, Jr. | F16K 41/12 251/335.1 |
| 3,702,624 | A * | 11/1972 | Fries | F16K 15/066 137/516.23 |
| 3,746,483 | A * | 7/1973 | Hindel | F16K 15/066 417/571 |
| 4,878,815 | A * | 11/1989 | Stachowiak | F04B 53/1025 417/454 |
| 4,924,901 | A * | 5/1990 | Valavaara | F04B 53/109 137/627.5 |
| 5,230,363 | A * | 7/1993 | Winn, Jr. | F04B 53/109 417/571 |
| 5,345,965 | A * | 9/1994 | Blume | F16K 25/005 137/902 |
| 6,705,846 | B2 | 3/2004 | Greiff et al. | |
| 7,121,812 | B2 * | 10/2006 | Forrest | F04B 53/22 417/571 |
| 9,464,631 | B2 | 10/2016 | Shaull et al. | |
| 11,859,723 | B2 * | 1/2024 | Surjaatmadja | F04B 53/1022 |
| 2008/0025857 | A1 | 1/2008 | Hurst et al. | |
| 2022/0307494 | A1 | 9/2022 | Kelton et al. | |

FOREIGN PATENT DOCUMENTS

EP            3 336 356 A1      6/2018

* cited by examiner

*Primary Examiner* — Thomas Fink

(57) ABSTRACT

A valve assembly may include a first valve having a central opening and a guide element connected within the central opening. The valve assembly may include a second valve having a valve stem extending through the guide element to define a protruding portion of the valve stem, and a spring retainer on the protruding portion of the valve stem. The valve assembly may include a spring disposed between the spring retainer and the guide element. The spring may be configured to bias both the first valve and the second valve.

20 Claims, 4 Drawing Sheets

VALVE ASSEMBLY FOR A FLUID PUMP

TECHNICAL FIELD

The present disclosure relates generally to fluid pumps and, for example, to a valve assembly for a fluid pump.

BACKGROUND

Hydraulic fracturing is a well stimulation technique that typically involves pumping hydraulic fracturing fluid into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids.

A hydraulic fracturing system may employ one or more fluid pumps for pressurizing hydraulic fracturing fluid. A fluid pump has a suction side, at which low-pressure fluid enters the fluid pump via a suction valve to be pressurized, and a discharge side at which high-pressure fluid pressurized by the fluid pump exits the fluid pump via a discharge valve. The suction valve and the discharge valve each may be biased to a closed position using a respective spring. These springs may wear quickly and are frequently replaced, thereby adding complexity to servicing the fluid pump. Furthermore, each spring is susceptible to individual failure, and the failure of either spring necessitates pump maintenance and results in downtime.

The valve assembly of the present disclosure solves one or more of the problems set forth above and/or other problems in the art.

SUMMARY

A valve cartridge for a fluid pump may include a cartridge housing, a fluid cavity defined in the cartridge housing, and a suction valve configured to control flow into the fluid cavity. The suction valve may have a central opening and a guide element connected within the central opening. The valve cartridge may include a discharge valve configured to control flow out from the fluid cavity. The discharge valve may have a valve stem extending through the guide element to define a protruding portion of the valve stem, and a spring retainer on the protruding portion of the valve stem. The valve cartridge may include a spring disposed between the spring retainer and the guide element. The spring may be configured to bias both the suction valve and the discharge valve to closed positions.

A valve assembly for a fluid end of a hydraulic fracturing pump may include a first valve having a central opening and a guide element connected within the central opening. The valve assembly may include a second valve having a valve stem extending through the guide element to define a protruding portion of the valve stem, and a spring retainer on the protruding portion of the valve stem. The valve assembly may include a spring disposed between the spring retainer and the guide element. The spring may be configured to bias both the first valve and the second valve.

A hydraulic fracturing pump may include a fluid end having a fluid end block with a bore, and a plunger configured to reciprocate with respect to the bore. The hydraulic fracturing pump may include a power end operably connected to the plunger. The hydraulic fracturing pump may include a valve cartridge, configured for insertion into and removal from the bore as a unit. The valve cartridge may include a cartridge housing, a fluid cavity defined in the cartridge housing, and a valve assembly configured to control flow through the fluid cavity. The valve assembly may include a first valve having a central opening and a guide element connected within the central opening. The valve assembly may include a second valve having a valve stem extending through the guide element to define a protruding portion of the valve stem. The valve assembly may include a spring retainer on the protruding portion of the valve stem. The valve assembly may include a spring disposed between the spring retainer and the guide element. The spring may be configured to bias both the first valve and the second valve to closed positions.

DETAILED DESCRIPTION

This disclosure relates to a valve assembly, which is applicable to any positive displacement fluid pump. For example, the fluid pump may be a hydraulic fracturing pump.

Figure 1:
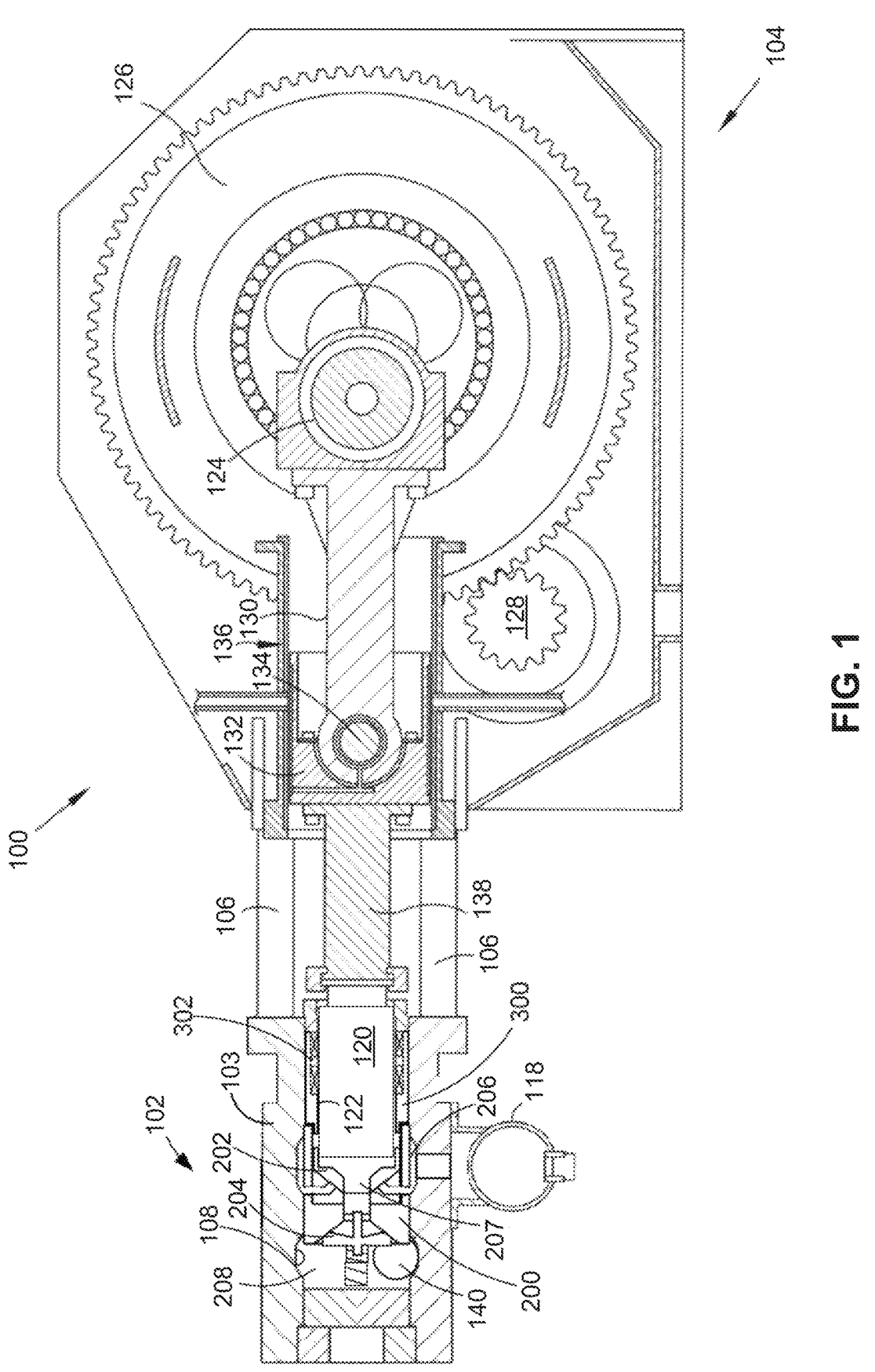
FIG. 1 is a cross-sectional view of an example fluid pump.

FIG. 1 is a cross-sectional view of an example fluid pump 100. The fluid pump 100 includes a fluid end 102 and a power end 104. The fluid end 102 may be connected to the power end 104 by stay rods 106. The fluid end 102 includes a fluid end block 103 having one or more bores 108 (only one shown). For example, the fluid pump 100 may include one, two, three, four, five, or more bores 108. In some implementations, the fluid pump 100 may be mounted on a trailer to facilitate transportation of the fluid pump 100 between operational sites. In some implementations, the fluid pump 100 may be a hydraulic fracturing pump. For example, the fluid pump 100 may have a capability to produce a discharge pressure of at least 8,000 psi, at least 10,000 psi, at least 12,000 psi, or at least 15,000 psi.

The bore 108 is a passageway through the fluid end block 103 of the fluid end 102. The fluid end 102 may include a valve cartridge 200 disposed in the bore 108 (e.g., a respective valve cartridge 200 may be disposed in each bore 108 of the fluid end 102). For example, the valve cartridge 200 is configured for insertion into, and removal from, the bore 108 as a unit. The valve cartridge 200 includes a suction valve 202 and a discharge valve 204. The bore 108 may be contoured such that when the valve cartridge 200 is disposed in the bore 108, the valve cartridge 200 partitions the bore 108 into a suction chamber 206, a pressure chamber 207, and a discharge chamber 208 of the bore 108. For example, the suction chamber 206 of the bore 108 may be fluidly connected to a suction manifold 118, and the discharge chamber 208 of the bore 108 may be fluidly connected to a discharge manifold 140.

In operation, fluid is pressurized to a low pressure (e.g., 80 psi) by an outside system (e.g., a centrifugal pump) and pushed through the suction manifold 118 through the suction valve 202 and into the pressure chamber 207. The fluid is then pumped in response to a forward stroke of a plunger 120 and flows through the discharge valve 204.

In operation, the plunger 120 moves in a plunger bore 122 and is driven by the power end 104 of the fluid pump 100. The power end 104 includes a crankshaft 124 that is rotated by a gearbox output 126, which is illustrated by a single gear but may be more than one gear. A gearbox input 128 is coupled to a transmission (not shown) and/or a prime mover (not shown), such as a diesel engine, to rotate the gearbox input 128 during operation. A connecting rod 130 mechanically connects the crankshaft 124 to a crosshead 132 via a wrist pin 134. The crosshead 132 is mounted within a stationary crosshead housing 136, which constrains the crosshead 132 to linear reciprocating movement. A pony rod 138 connects to the crosshead 132 and has its opposite end connected to the plunger 120 to enable reciprocating movement of the plunger 120.

In operation, movement of the crankshaft 124 causes the plunger 120 to reciprocate with respect to the bore 108 (e.g., to reciprocate toward and away from the bore 108). As the plunger 120 translates away from the bore 108 (a suction stroke of the plunger 120), the pressure of the fluid inside the pressure chamber 207 decreases, which creates a pressure differential across the suction valve 202. The pressure differential across the suction valve 202 enables actuation of the suction valve 202 to allow the fluid to enter the pressure chamber 207 from the suction manifold 118 (e.g., the suction valve 202 may open responsive to the pressure differential). The pumped fluid is pushed into the pressure chamber 207 as the plunger 120 continues to translate away from the bore 108. As the plunger 120 changes directions and moves toward the bore 108 (a discharge stroke of the plunger 120), the fluid pressure inside the pressure chamber 207 increases, which creates a pressure differential across the discharge valve 204. Fluid pressure inside the pressure chamber 207 continues to increase as the plunger 120 approaches the bore 108 until the pressure differential across the discharge valve 204 is great enough to actuate the discharge valve 204 and enable the fluid to exit the pressure chamber 207 (e.g., the discharge valve 204 may open responsive to the pressure differential).

The fluid end 102 may include a packing cartridge 300 disposed in the bore 108 (e.g., a respective packing cartridge 300 may be disposed in each bore 108 of the fluid end 102). For example, the packing cartridge 300 is configured for insertion into, and removal from, the bore 108 as a unit. The packing cartridge 300 is configured to retain a packing 302 (e.g., a packing set, a packing assembly, or the like) in the bore 108 around the plunger 120. In some implementations, the packing 302 may be held in a packing sleeve. The packing 302 may include one or more rings (e.g., composed of polymer, metal, or another material) that circumferentially surround the plunger 120 and that are configured to prevent leakage of fluid from around the plunger 120.

As indicated above, FIG. 1 is provided as an example. Other examples may differ from what is described with regard to FIG. 1.

Figure 2:
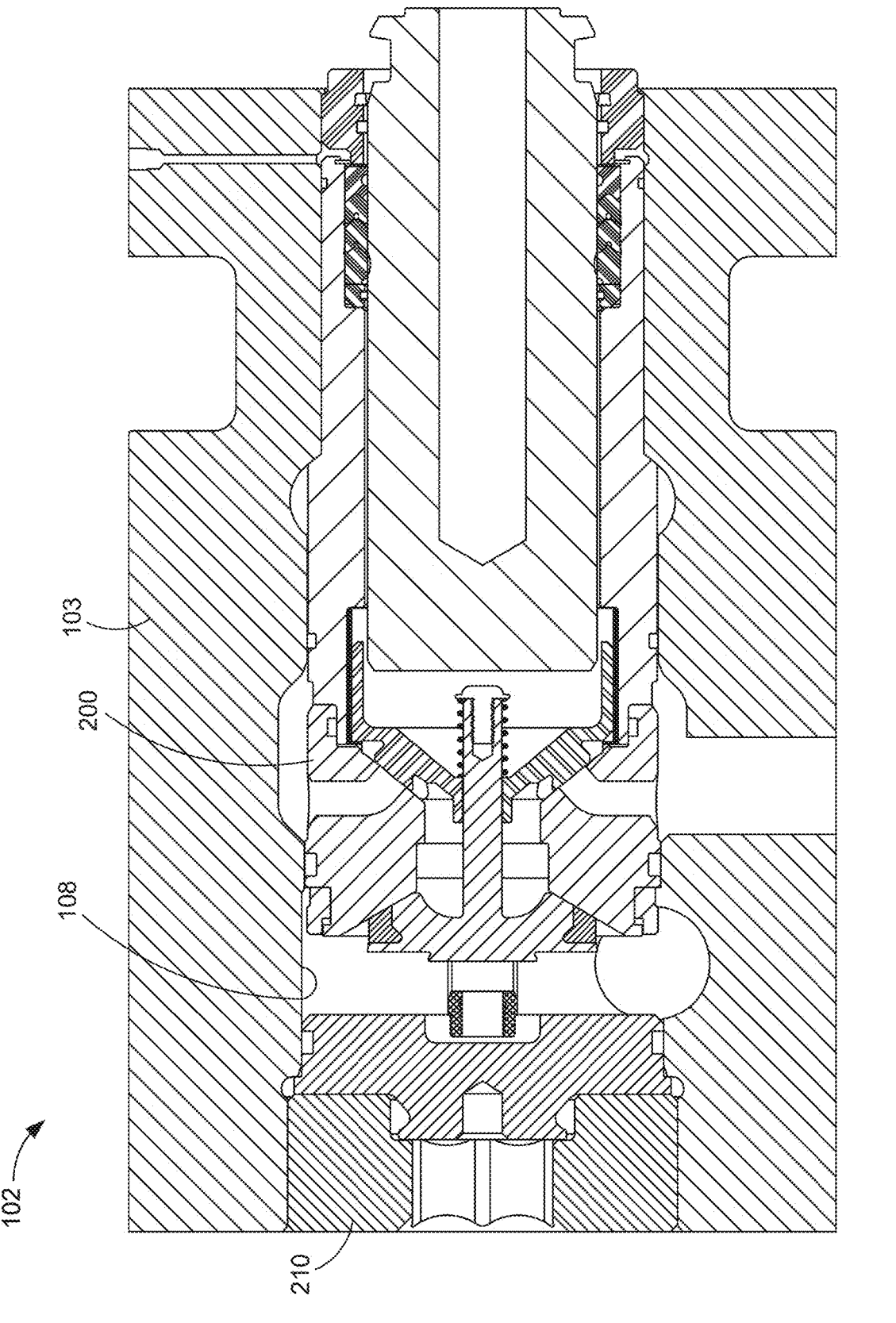
FIG. 2 is a cross-sectional view of an example fluid end of a fluid pump.

FIG. 2 is a cross-sectional view of an example of the fluid end 102 of the fluid pump 100. The example fluid end 102 of FIG. 2 may include the valve cartridge 200 that is removably disposed in the bore 108. The valve cartridge 200 may be arranged in the bore 108 co-axially with the plunger 120.

In some examples, the fluid end 102 may include an end cap assembly 210 disposed in the bore 108. The end cap assembly 210 may seal an end of the bore 108. The end cap assembly 210 may be removed from the bore 108 to provide access to the valve cartridge 200. Thus, with the end cap assembly 210 removed from the bore 108, the valve cartridge 200 may be removed from the fluid end 102, as a unit, to facilitate repair or replacement of the valve cartridge 200. Similarly, a replacement, or a repaired, valve cartridge 200 may be inserted into the bore 108 and the end cap assembly 210 may be replaced back into the bore 108 to reseal the bore 108.

As indicated above, FIG. 2 is provided as an example. Other examples may differ from what is described with regard to FIG. 2.

Figure 3:
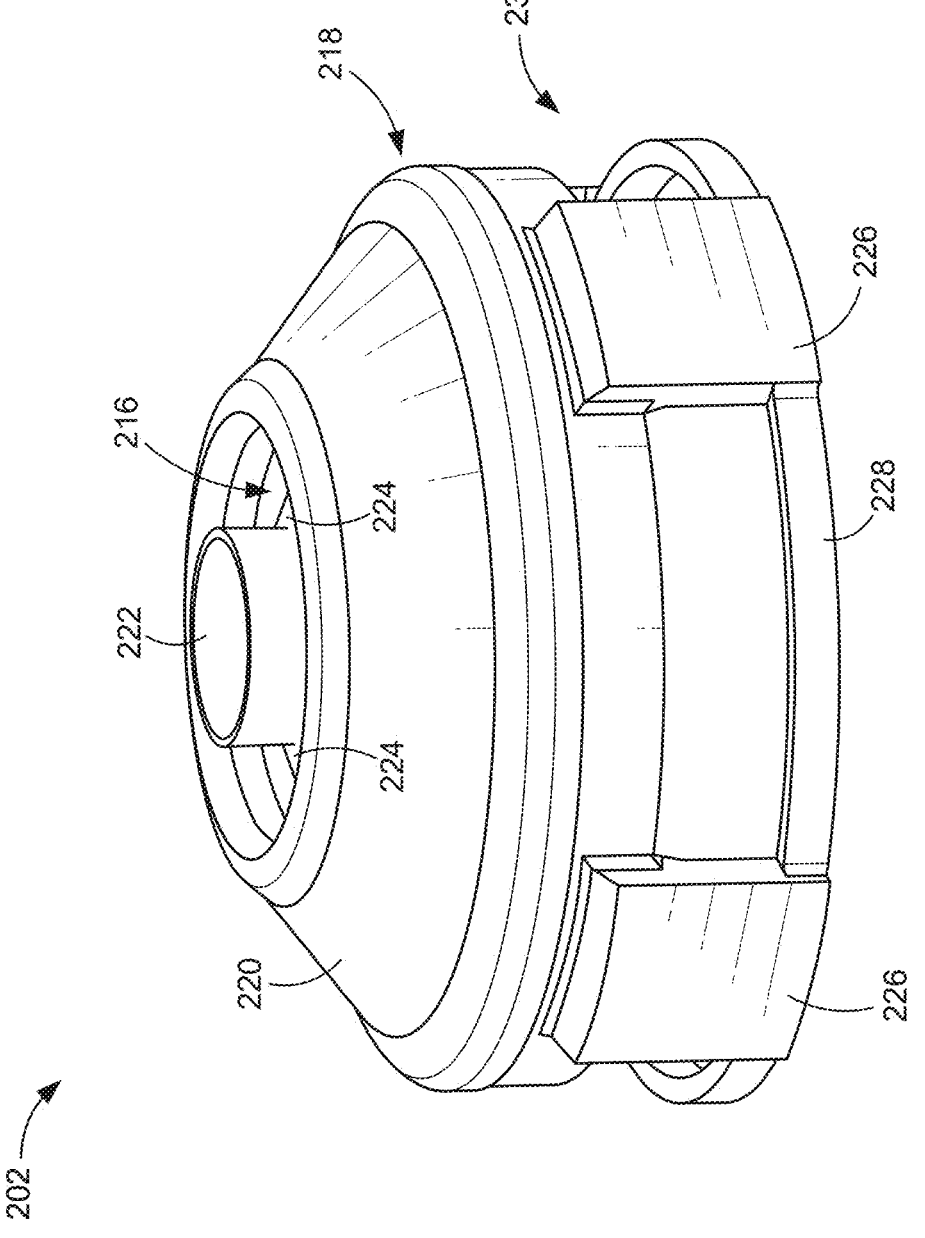
FIG. 3 is a perspective view of an example suction valve.

FIG. 3 is a perspective view of an example of the suction valve 202. In some examples, the suction valve 202 may be in a different form from that depicted in FIG. 3. In some examples, the discharge valve 204, rather than the suction valve 202, may be in the form depicted in FIG. 3.

The suction valve 202 may have an annular shape having a central opening 216, a perimeter edge 218, and a sealing surface 220 defined between the central opening 216 and the perimeter edge 218. In some examples, the sealing surface 220 may be sloped inwardly from the perimeter edge 218 to the central opening 216, thereby giving the suction valve 202 the shape of a conical frustum.

A guide element 222 may be connected to the suction valve 202 within the central opening 216. For example, the guide element 222 may be positioned at a center of the central opening 216 (e.g., concentric with the central opening 216). The guide element 222 may provide a sleeve (e.g., a tube) to receive a valve stem of the discharge valve 204, as described in connection with FIG. 4. The guide element 222 may be connected to the suction valve 202 by one or more spokes 224, thereby allowing fluid to flow through the central opening 216 around the guide element 222, as described in connection with FIG. 4.

The suction valve 202 may include one or more guiding components 226 (e.g., projecting away from the sealing surface 220, and configured to guide opening and closing of the suction valve 202. In some examples, the one or more guiding components 226 may include one or more axial guide portions of the suction valve 202 that extend along an axis of the bore 108 and/or define a circular outer profile. For example, the guiding components 226 may include a plurality of legs (e.g., three legs or four legs) spaced approximately evenly around the perimeter edge 218 of the suction valve 202. The legs may be configured to slide along a surface to thereby maintain the suction valve 202 aligned with respect to a valve seat. In some examples, one or more hoops 228 may connect between the legs to provide additional stability. The legs and/or the hoops 228 may define a base component 230 of the suction valve 202, having a frame-like structure that provides minimal flow resistance.

As indicated above, FIG. 3 is provided as an example. Other examples may differ from what is described with regard to FIG. 3.

Figure 4:
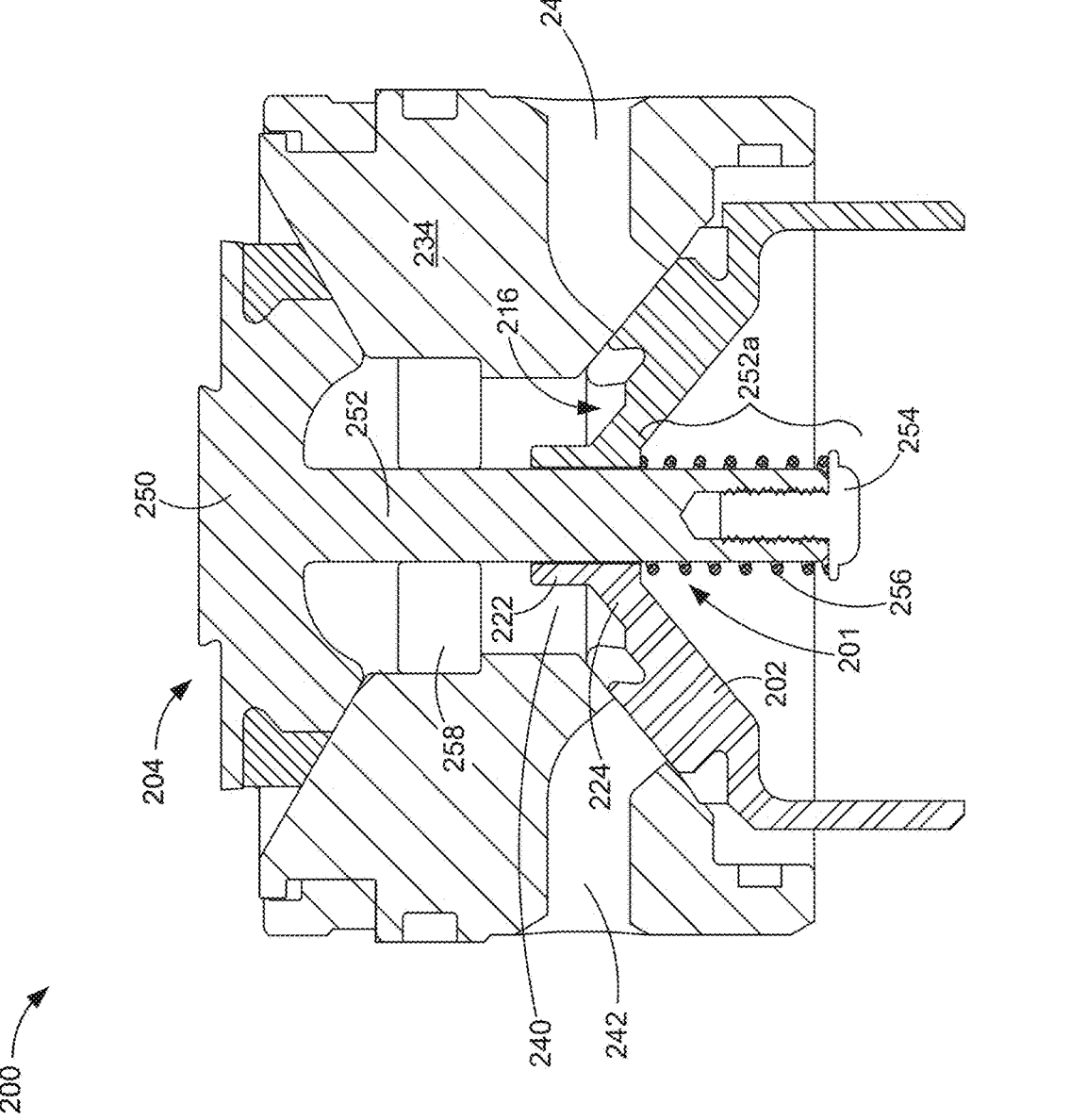
FIG. 4 is a cross-sectional view of an example valve cartridge.

FIG. 4 is a cross-sectional view of an example of the valve cartridge 200. As shown, the valve cartridge 200 includes a valve assembly 201 that includes the suction valve 202 and the discharge valve 204. In some examples, the valve assembly 201 may be installed directly in the fluid end 102 without the use of a valve cartridge 200.

The valve cartridge 200 includes a cartridge housing 234, which may have an overall cylindrical shape. The suction valve 202 and the discharge valve 204 are operably connected to the cartridge housing 234 (e.g., connected in a manner that allows the suction valve 202 and the discharge valve 204 to open and close in response to pressure differentials). Surfaces of the cartridge housing 234 (e.g., sloped surfaces) may define valve seats for the suction valve 202 and the discharge valve 204. The cartridge housing 234 may define a fluid cavity 240.

One or more (e.g., multiple) suction passageways 242 are defined through the cartridge housing 234 and open into the fluid cavity 240. For example, multiple suction passageways 242 may extend radially around the cartridge housing 234. The suction passageway(s) 242 may fluidly connect the suction chamber 206 of the bore 108 with the fluid cavity 240.

The suction valve 202 is configured to control flow from the suction passageway(s) 242 into the fluid cavity 240, and the discharge valve 204 is configured to control flow out from the fluid cavity 240. For example, in an open position, the suction valve 202 may allow flow from the suction passageway(s) 242 into the fluid cavity 240 (e.g., the ends of the suction passageway(s) 242 that lead into the fluid cavity 240 are not sealed by the suction valve 202 in the open position). For example, during a suction stroke of the plunger 120, the suction valve 202 may open to allow flow from the suction passageway(s) 242 into the fluid cavity 240.

In a closed position, the suction valve 202 may seal the suction passageway(s) 242 from the fluid cavity 240 (e.g., the ends of the suction passageway(s) 242 that lead into the fluid cavity 240 are sealed by the suction valve 202 in the closed position). However, the suction valve 202 may be arranged in the fluid cavity 240 such that the central opening 216 is in a flow path through the fluid cavity 240. Thus, in the closed position, the suction valve 202 may allow flow through the fluid cavity 240 via the central opening 216. For example, during a discharge stroke of the plunger 120, the suction valve 202 may close to seal the suction passageway (s) 242 from the fluid cavity 240 (thereby stopping suction flow), yet also allow flow through the fluid cavity 240 via the central opening 216 (thereby allowing discharge flow). Moreover, during the discharge stroke of the plunger 120, the discharge valve 204 may open, such that the flow through the fluid cavity 240 via the central opening 216 is discharged through the open discharge valve 204.

The discharge valve 204 includes a valve head 250 (e.g., having a sealing face) and a valve stem 252 extending from the valve head 250. The valve stem 252 extends through and beyond the guide element 222 of the suction valve 202 (e.g., the valve stem 252 is inserted through the guide element 222) so as to define a protruding portion 252a of the valve stem 252. Moreover, the valve stem 252 is slidably engaged with the guide element 222. The discharge valve 204 further includes a spring retainer 254 on the protruding portion 252a of the valve stem 252. For example, as shown, the spring retainer 254 may include a fastener (e.g., a bolt) inserted into (e.g., threaded into) an end of the valve stem 252. However, the spring retainer 254 may include another type of element attached to the valve stem 252, or may be a feature of the valve stem 252 itself, that provides positioning and support for a spring. For example, the spring retainer 254 may include a retaining clip on the valve stem 252.

The valve assembly 201 further includes a spring 256 disposed between the spring retainer 254 and the guide element 222 (e.g., an underside of the guide element 222). For example, the spring 256 may surround the protruding portion 252a of the valve stem 252. The spring 256 may abut, or may be connected to, the spring retainer 254 and the guide element 222. Accordingly, the guide element 222, in addition to providing guiding of the discharge valve 204, also acts as a spring retainer. In some examples, the valve cartridge 200 may further include a valve guide 258 (e.g., in addition to the guide element 222 of the suction valve 202) to help maintain proper orientation of the discharge valve 204.

The spring 256 biases both the suction valve 202 and the discharge valve 204 to closed positions with respect to the cartridge housing 234. In this way, only a single spring is used rather than respective springs being needed for the suction valve 202 and the discharge valve 204. For example, an opening of the suction valve 202 compresses the spring 256 between the guide element 222 and the spring retainer 254 by a movement of the suction valve 202 and the guide element 222 toward the spring retainer 254. As another example, an opening of the discharge valve 204 compresses the spring 256 between the guide element 222 and the spring retainer 254 by a movement of the discharge valve 204 and the spring retainer 254 toward the guide element 222 of the suction valve 202. The spring 256 may include one or more coil-type springs, one or more leaf springs, or another type of spring or biasing element that can be compressed between the guide element 222 and the spring retainer 254.

As indicated above, FIG. 4 is provided as examples. Other examples may differ from what is described with regard to FIG. 4.

INDUSTRIAL APPLICABILITY

The valve assembly 201 described herein may be used with any positive displacement fluid pump (e.g., a reciprocating positive displacement fluid pump). For example, a hydraulic fracturing pump may use the valve assembly 201 described herein to facilitate the pressurization of hydraulic fracturing fluid for hydraulic fracturing operations used to recover water, oil, natural gas, and/or other fluids from a rock formation. Generally, a suction valve and a discharge valve of a fluid pump, such as a hydraulic fracturing pump, each may be biased to a closed position using a respective spring. These springs may wear quickly and are frequently replaced, thereby adding complexity to servicing the fluid pump. Furthermore, each spring is susceptible to individual failure, and the failure of either spring necessitates pump maintenance and results in downtime. The valve assembly 201 described herein uses a single spring to bias the suction valve 202 and the discharge valve 204 to a closed position. Accordingly, by using a single spring rather than two springs, the valve assembly 201 reduces the number of potential failure components, facilitates easier assembly of a fluid end, and simplifies maintenance of the fluid end. Moreover, the use of a single spring in the valve assembly 201 facilitates reducing the overall weight and size of the valve cartridge 200.

The foregoing describes only some embodiments, and alterations, modifications, additions and/or changes can be made thereto without departing from the scope and spirit of the disclosed embodiments, the embodiments being illustrative and not restrictive. Furthermore, implementations are not limited to the disclosed embodiments, and may cover various modifications and equivalent arrangements included within the spirit and scope of the disclosed embodiments. Also, the various embodiments described above may be implemented in conjunction with other embodiments, for example, aspects of one embodiment may be combined with aspects of another embodiment to realize yet other embodiments. Further, each independent feature or component of any given assembly or process may constitute an additional embodiment. As used herein, the singular forms of "a," "an," and "the" include plural referents unless the context clearly dictates otherwise. In addition, as used herein, the term "or" means "and/or" unless the context clearly dictates otherwise.

What is claimed is:

1. A valve cartridge for a fluid pump, comprising:
a cartridge housing;
a fluid cavity defined in the cartridge housing;
a suction valve assembly, comprising:
a suction valve, configured to control flow into the fluid cavity, having an annular shape defining a central opening, a perimeter edge, and a sealing surface sloped inwardly from the perimeter edge to the central opening;
a guide element connected within the central opening; and
a plurality of axial guide portions, projecting from the suction valve away from the fluid cavity, configured to slide along a surface to guide opening and closing of the suction valve;
a discharge valve configured to control flow out from the fluid cavity, the discharge valve having a valve stem extending through the guide element to define a protruding portion of the valve stem, and a spring retainer on the protruding portion of the valve stem; and
a spring disposed between the spring retainer and the guide element, the spring configured to bias both the suction valve and the discharge valve to closed positions.

2. The valve cartridge of claim 1, wherein the spring retainer is a fastener inserted into an end of the valve stem or a retaining clip on the valve stem.

3. The valve cartridge of claim 1, wherein the guide element is connected to the suction valve by one or more spokes.

4. The valve cartridge of claim 1, wherein an opening of the suction valve is to compress the spring between the guide element and the spring retainer by a movement of the guide element toward the spring retainer, and
wherein an opening of the discharge valve is to compress the spring between the guide element and the spring retainer by a movement of the spring retainer toward the guide element.

5. The valve cartridge of claim 1, wherein the suction valve, in an open position, is to allow flow from one or more suction passageways into the fluid cavity, and
wherein the suction valve, in a closed position, is to seal the one or more suction passageways from the fluid cavity, and to allow flow through the fluid cavity via the central opening.

6. The valve cartridge of claim 1, wherein the discharge valve is configured to seal an end of the cartridge housing to control flow out from the fluid cavity.

7. The valve cartridge of claim 1, wherein the spring surrounds the protruding portion of the valve stem.

8. The valve cartridge of claim 1, wherein the plurality of axial guide portions comprises a plurality of axial guide legs projecting from the perimeter edge of the suction valve.

9. The valve cartridge of claim 1, wherein the suction valve assembly further comprises a hoop connected between the plurality of axial guide portions.

10. A valve assembly for a fluid end of a hydraulic fracturing pump, comprising:
a first valve assembly, comprising:
a first valve having an annular shape defining a central opening, a perimeter edge, and a sealing surface sloped inwardly from the perimeter edge to the central opening;
a guide element connected within the central opening; and a plurality of axial guide legs configured to slide along a surface to guide opening and closing of the first valve;
a second valve assembly, comprising:
a second valve having a valve stem extending through the guide element to define a protruding portion of the valve stem; and
a spring retainer on the protruding portion of the valve stem; and
a spring disposed between the spring retainer and the guide element, the spring configured to bias both the first valve and the second valve, wherein the plurality of axial guide legs extend from the first valve away from the second valve.

11. The valve assembly of claim 10, wherein the guide element is connected to the first valve by one or more spokes.

12. The valve assembly of claim 10, wherein the spring surrounds the protruding portion of the valve stem.

13. The valve assembly of claim 10, wherein the first valve is in a shape of a conical frustum.

14. The valve assembly of claim 10, wherein the first valve assembly further comprises a hoop connected between the plurality of axial guide legs.

15. A hydraulic fracturing pump, comprising:
a fluid end having a fluid end block with a bore, and a plunger configured to reciprocate with respect to the bore;
a power end operably connected to the plunger; and
a valve cartridge, configured for insertion into and removal from the bore as a unit, comprising:
a cartridge housing;
a fluid cavity defined in the cartridge housing; and
a valve assembly configured to control flow through the fluid cavity, wherein the valve assembly comprises:
a first valve assembly, comprising:
a first valve having an annular shape defining a central opening, a perimeter edge, and a sealing surface sloped inwardly from the perimeter edge to the central opening;
a guide element connected within the central opening; and
a plurality of axial guide portions, projecting from the first valve away from the fluid cavity, configured to slide along a surface to guide opening and closing of the first valve;
a second valve assembly, comprising:
a second valve having a valve stem extending through the guide element to define a protruding portion of the valve stem; and
a spring retainer on the protruding portion of the valve stem; and
a spring disposed between the spring retainer and the guide element, the spring configured to bias both the first valve and the second valve to closed positions.

16. The hydraulic fracturing pump of claim 15, wherein the first valve is to open during a suction stroke of the plunger to allow flow into the fluid cavity, and
wherein the first valve is to close during a discharge stroke of the plunger to allow flow through the fluid cavity via the central opening.

17. The hydraulic fracturing pump of claim 15, wherein the first valve is to close during a suction stroke of the plunger, and
wherein the first valve is to open during a discharge stroke of the plunger to allow flow out from the fluid cavity.

18. The hydraulic fracturing pump of claim 15, wherein the guide element is connected to the first valve by one or more spokes.

19. The hydraulic fracturing pump of claim 15, wherein an opening of the first valve is to compress the spring between the guide element and the spring retainer by a movement of the guide element toward the spring retainer, and wherein an opening of the second valve is to compress the spring between the guide element and the spring retainer by a movement of the spring retainer toward the guide element.

20. The hydraulic fracturing pump of claim 15, wherein the plurality of axial guide portions comprises a plurality of axial guide legs projecting from the perimeter edge of the first valve, and wherein the first valve assembly further comprises a hoop connected between the plurality of axial guide legs.

\*　\*　\*　\*　\*